US008016680B1

(12) United States Patent
Hutter et al.

(10) Patent No.: US 8,016,680 B1
(45) Date of Patent: *Sep. 13, 2011

(54) MASSIVELY MULTIPLAYER EDUCATIONAL ONLINE ROLE PLAYING GAME

(76) Inventors: Robert J Hutter, San Francisco, CA (US); Thomas Devaney, New York, NY (US)

( * ) Notice: Subject to any disclaimer, the term of this patent is extended or adjusted under 35 U.S.C. 154(b) by 755 days.

This patent is subject to a terminal disclaimer.

(21) Appl. No.: 11/739,646

(22) Filed: Apr. 24, 2007

Related U.S. Application Data

(63) Continuation of application No. 11/285,896, filed on Nov. 23, 2005.

(51) Int. Cl.
*A63F 13/00* (2006.01)
(52) U.S. Cl. .................. 463/42; 463/9; 463/40; 463/41; 434/128; 434/322; 434/350
(58) Field of Classification Search ............... 463/9, 42; 434/128, 322, 350
See application file for complete search history.

(56) References Cited

U.S. PATENT DOCUMENTS

| 5,035,625 | A | | 7/1991 | Munson et al. |
| 5,143,378 | A | * | 9/1992 | Joel ............................... 257/714 |
| 5,730,654 | A | | 3/1998 | Brown |
| 6,024,572 | A | * | 2/2000 | Weyer ........................... 434/169 |
| 6,210,272 | B1 | | 4/2001 | Brown |
| 6,561,811 | B2 | | 5/2003 | Rapoza et al. |
| 6,758,746 | B1 | * | 7/2004 | Hunter et al. ..................... 463/9 |
| 2002/0165630 | A1 | | 11/2002 | Arthur et al. |
| 2004/0067469 | A1 | * | 4/2004 | Rogan et al. ................... 434/107 |
| 2004/0143852 | A1 | * | 7/2004 | Meyers ........................... 725/133 |
| 2005/0143174 | A1 | * | 6/2005 | Goldman et al. ............... 463/42 |
| 2006/0003305 | A1 | * | 1/2006 | Kelmar .......................... 434/350 |
| 2006/0082060 | A1 | * | 4/2006 | Soto .............................. 273/242 |

OTHER PUBLICATIONS

Carmen Sandiego's Think Quick Challenge, dated Dec. 20, 2002, published on the Internet at http://web.archive.org/web/20021220125547/http://www.kindclick.com/descript/carmen_think.htm.

* cited by examiner

*Primary Examiner* — Ronald Laneau
*Assistant Examiner* — Justin Myhr
(74) *Attorney, Agent, or Firm* — William Keyworth; Bill & Mary Lou Inc.

(57) ABSTRACT

A massively multiplayer educational online game presents a computer generated gameplay world where acquiring and demonstrating mastery of educational skills is a requirement for survival and advancement of a learner's game character. The game provides a method for effectively teaching a set of target educational skills by motivating the learner to improved understanding of the skills by having to demonstrate the skills as part of the game. The skills become immediately meaningful and relevant to the learner within the game itself, as feedback on skill understanding is provided directly, indirectly, or both directly and indirectly through game performance, motivating the learner to improve understanding of the skills.

22 Claims, 13 Drawing Sheets

MASSIVELY MULTIPLAYER EDUCATIONAL ONLINE ROLE PLAYING GAME

CROSS-REFERENCE TO RELATED APPLICATIONS

This application is a continuation of application Ser. No. 11/285,896 filed Nov. 2, 2005, which is incorporated herein by reference in its entirety. Application Ser. No. 11/285,896 claims priority from Provisional Patent Application No. 60/60,678, "Massively Multiplayer Online Game" filed Nov. 2, 2004, which is incorporated herein by reference in its entirety.

STATEMENT REGARDING FEDERALLY SPONSORED RESEARCH AND DEVELOPMENT

Not Applicable.

BACKGROUND OF THE INVENTION

1. Field of the Invention

This application relates to a system of motivating students to achieve educational goals using a computerized gaming activity requiring the acquisition of academic skills and demonstration of the ability to perform the acquired academic skills to successfully enjoy the gaming activity.

2. Description of Related Art

Computerized gaming has become a popular form of entertainment. Many computerized games provide a virtual world with the player assuming the role of a character interacting with other characters, objects, or locations in attempting to accomplish a series of tasks leading to some ultimate goal. Currently such computerized gaming may be played on a variety of hardware platforms from specialized individual computer gaming devices to games played with a general-purpose PC on a web site on the Internet. Games that create elaborate virtual worlds and allow multiple players to inhabit these worlds are known as massively multiplayer online role playing games. A variety of these games are commonly played using the Internet.

There is an important problem in educating students in skills prescribed by formal schooling programs of all types. The problem is motivation in educational settings where the skills taught are not immediately applicable to the student's everyday life. There is an artificial motivation required in order to successfully master these skills. Much of formal schooling proceeds under the basis that this artificial motivation is best achieved by compulsion on the one hand and/or learner self-motivation on the other. This framework is not ideal and results in the wide variation in outcomes that is endemic to most schooling.

There is criticism by parents and educators of the time spent by young people in playing computerized games, particularly if the time spent would better be used for school-related learning activities to improve scholastic performance. Therefore it is desirable to use the popularity of computerized game playing to motivate students in their academic studies to enable the student to enjoy the game and the learning experience.

One example of combining a game and learning software is described in U.S. Pat. No. 6,755,740 (Wen et al). This system permits a player to choose between playing the next game stage or running the learning software. If the player selects the game, the game will play normally. If the player selects the learning software it will advance the game an amount related to the score on the learning exercise, providing an incentive for the player to use the learning software. Another approach to combining game software and learning software is described in U.S. Patent Application publication number 2005/0208459 (Chang et al.). This system stops the game at pre-selected events and activates the learning software. The learning software exercise must be completed satisfactorily to permit continued playing of the game until another pre-selected event occurs to activate the learning software.

It would be desirable to integrate the desired skill to be learned into a game students found desirable to play, rather than having the game activity separate from the learning activity as in the prior art. This approach provides a motivation to the player to excel at the skill in order to advance in the game. Acquiring the skill then becomes meaningful and relevant to the student.

SUMMARY OF THE INVENTION

The massively multiplayer educational online role playing game is a learning tool that introduces a computer generated gameplay world where acquiring and demonstrating mastery of educational skills is a requirement for survival and advancement of the learner's representative identity, or character, in the game world. The game world, or realm, is played by multiple learners each with an individual character. The characters are monitored by a level system that reflects game performance and assigns a variable level corresponding to that performance. The performance is based on mastery of a set of target education skills. The learners become engaged with their character through the ability to customize the character's appearance and characteristics so they identify with the character.

The characters interact with the game world through an activity module that initially assigns them individual activities with a tutorial based on a target education skill. These activities are called jobs in the system. The skill is practiced in the job and immediate corrective feedback is provided on errors, providing feedback to the learner on errors in demonstration of the target education skills. A job is completed on satisfactory demonstration of the skill. The character's game level advances upon satisfactory completion of the skill practice, and is eligible to move to the next job, which will have an additional target educational skill. Each job engages the learner in study and demonstration of the target education skills as needed to demonstrate mastery, thus relating the skill to the learner's character performing an activity using the skill, so the skill becomes immediately meaningful and relevant.

Once sufficient jobs are completed to demonstrate a mastery of the basic target education skills the character level is high enough to permit participation in projects. Projects are assigned a level so only characters at that predetermined level may participate. They allow the learner to use the skills learned in performing jobs to advance game play. Each project requires a skill practice of one or more target education skills at a level commensurate with that practiced in the jobs. Several skills may be required for some projects. Completion of a project gives the character a persistent gameplay object (PGO) or may provide an enhancement to the character itself by enhancing a specified character attribute. Access to the next game activities, quests and competitions, is granted upon completion of sufficient projects to obtain the necessary PGOs or character enhancements.

Quest and competition participation requires the character possess the required PGOs or character enhancements for the specific quest or competition. Success in the quest or competition may require the character's or it's PGO have competitive performance attributes. These vary in their performance attributes. Those competitive characters with competitive PGOs will have mastered the target education skills and demonstrated this in the project skill practice. Those characters with poor performance have shown less than optimal mastery in the target educational skills. They may, however, return to the project for a new PGO, PGO enhancement, or character enhancement, which requires they again demonstrate the target education skill. The feedback to the learner on errors in demonstration of the target education skills is thus indirectly provided by participation in a combination of two or more activities related by the performance attributes of the character or character's PGO when the character is sufficiently advanced to participate in quests and competitions. This provides the means for game activities without target education skills.

Craft participation requires the character possess the PGO to be improved by the craft. In the craft the character again must demonstrate proficiency in a target education skill. Those learners demonstrating they have mastered the target education skill will be able to create elaborate improvements to the PGO or character using an object appearance editing tool. Those characters with poor performance will have access to more mundane improvements.

The PGOs a character possesses in the character inventory may also be bought and sold in a character object exchange. Here characters may exchange PGOs for monetary units, or use their monetary units to acquire desired PGOs. Characters are not permitted to own or exchange PGOs unless their level is sufficient to qualify them for the PGO.

The massively multiplayer educational online role playing game is therefore an apparatus for teaching learners a multiplicity of target education skills by first engaging the learner in the game playing system through creating the representative identity called the character who advances in the game world through performing jobs, projects, crafts, quests, and competitions to increase experience points and to obtain objects, and also exchange objects to obtain a collection that provides for success in quests and competitions. Further motivation is provided by forming groups of characters in a party to venture on a quest or to compete in a competition, or in a community, where the community characters contribute to improvements in the community. Success in quests, competitions and community improvements opens up additional quests and competitions to continually engage the learner. In each of these activities the learner is motivated to study a multitude of tutorials on target education skills, then practice the skills and repeat practicing the skills, as required to demonstrate the skills. In alternate embodiments the learner is allowed to be engaged in demonstrating the target education skills through several types of activities and corrective feedback is provided in direct and indirect ways, or in both ways. Tutorials are made available to the learner in the activities. Success in additional activities undertaken require the learner demonstrate increasing mastery of the target education skill.

The massively multiplayer educational online role playing game method provides learners a character for the game with a starting game level. It motivates learners by providing a compelling game setting, including group quests and competitions, and multiple ways to advance their character's game level so the quests and competitions are open to the character. The desire to participate in advancing their character level motivates learners to learn and demonstrate target education skills as these must be mastered in order to participate in the group quests and competitions. The target education skills used are based on a defined educational level. Teaching of the skills is accomplished through engaging the learner's character in an activity that requires studying a tutorial on the basic target education skills, then providing practice in the skill. Corrective feedback is initially given directly to the learner if errors are made in the practice, and the practice continued, as required, to demonstrate the learner learns the skill basics. Satisfactory demonstration advances the learner's game character level an amount dependent on the errors made in the practice, and additional activities are made available. The character's game performance is monitored and a game level assigned corresponding to that performance as the character completes activities and masters the basic target education skills.

Once sufficient activities are completed so the learner has a basic competency in the target education skills, the character is able to participate in more advanced activities arranged to produce a persistent gameplay object (PGO) or character attribute enhancement. These advanced activities require practicing the target education skills using two or more activities as corrective feedback on errors is given indirectly through the attributes of the PGO or character enhancement. The character's game performance is monitored and a game level assigned corresponding to that performance as the character completes the more advanced activities until sufficient PGOs and/or character enhancements are generated to permit entering quests and competitions. The character performance in the quests and competitions is dependant on the PGO attributes or character attributes and those with poor performance in practicing the target education skills will perform poorly. Returning to the advanced activities and demonstrating good performance in further practice in the target education skills is required to remedy this performance.

The game is made available to a learner by the learner's computer connecting to a server, such as on the Internet. Depending upon the embodiment, the server verifies the learner's payment status for participation in the game, and if satisfactory, the learner's profile is updated. The selected target education skills demonstrated as mastered determine the learner's character level and also the further demonstration of skills needed to improve this level. Successful demonstration of skills is documented in a character's profile, which is reflected in the learner's profile. Depending upon the embodiment, payment for continued participation in the game is periodically collected from the learner's account.

OBJECTS AND ADVANTAGES

One object of the present invention is to provide an educational game that motivates the player to acquire desired educational skills.

A second objective of the present invention is to provide an educational game that promotes teamwork by the players competing in groups or communities.

A third objective of the present invention is to provide an educational game that simulates real-world activities using a virtual economy.

A fourth objective of the present invention is to provide an educational game that objectively scores player educational achievement.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 1:
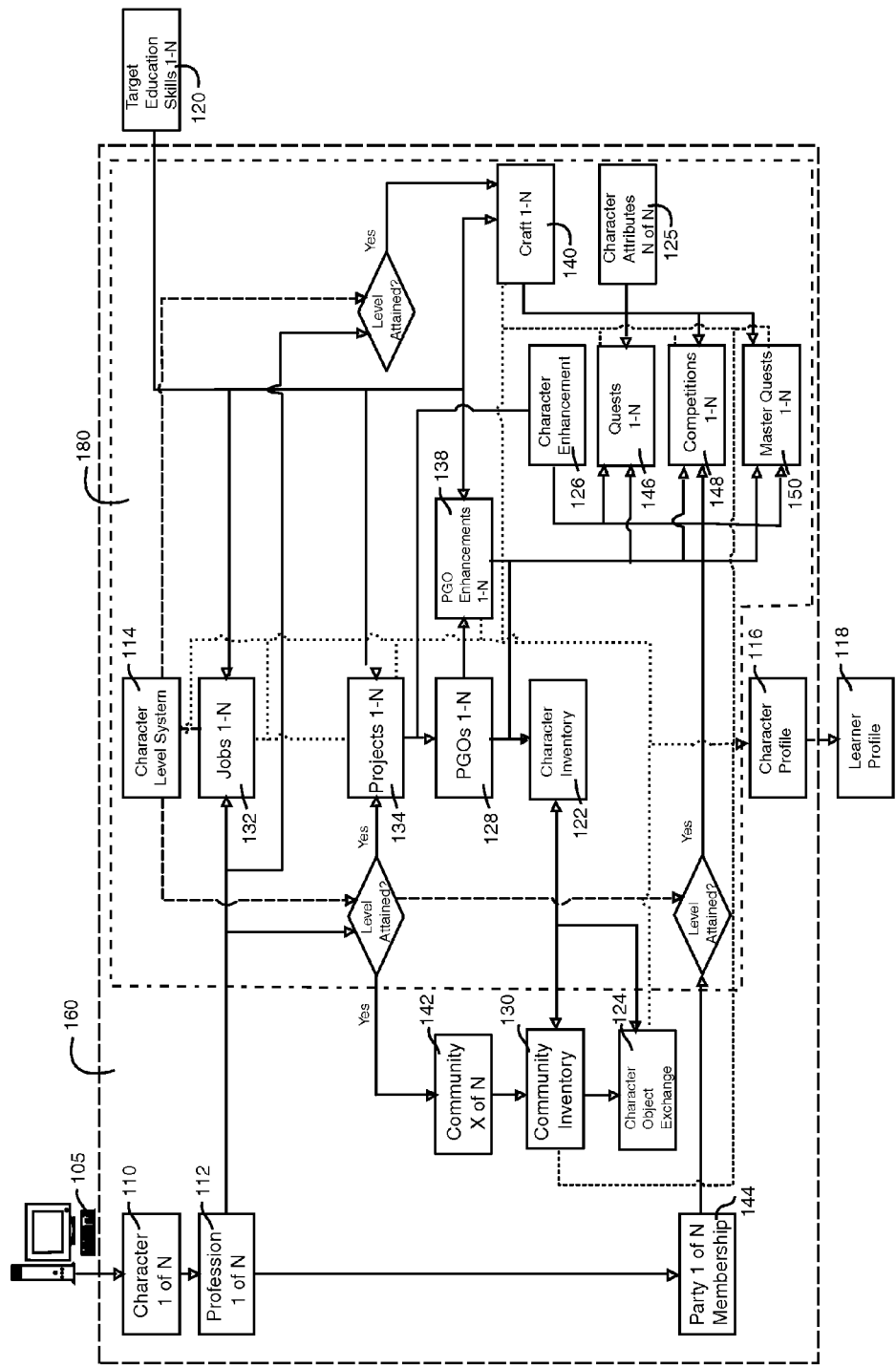
FIG. 1 is a block diagram of the system structure of the invention.

These reference numbers are used in the drawings to refer to areas or features of the invention.

105 Learner Control Interface
110 Characters
112 Professions
114 Character Level System
116 Character Profile
118 Learner Profile
120 Target Education Skills
122 Character Inventory
124 Character Inventory Exchange
125 Character Attribute
126 Character Enhancement
128 PGO
130 Community Inventory
132 Jobs
134 Projects
136 Project Activity
138 PGO Enhancement
139 PGO Enhanced
140 Craft
142 Community
144 Party Membership
146 Quests
148 Competitions
150 Master Quests
154 Craft Job
155 Object Appearance Editing Tool
156 Craft Object Generation
158 Craft Object Enhancement Generation
160 Realm
162 Domain
164 Craft Zone
170 Skill Tutorial
172 Skill Practice
174 Skill Corrective Feedback
176 Skill Mastery Score
178 Reward
179 Monetary Unit
180 Activity Module
190 Community Project
200 Learner Connection
202 Billing System
204 Credit Validation

DETAILED DESCRIPTION OF THE INVENTION

The massively multiplayer educational online role playing game system comprises a computer generated realm (160), as shown on FIG. 1, that serves as the social world framework to provide motivation for inducing frequent gameplay. An activity module (180) provides for the activities in the realm that use the target education skills the game is designed to teach. The activities include jobs (132), projects (134), persistent gameplay object (PGO) enhancements (138), character enhancements (126) crafts (140), quests (146), competitions (148) and master quests (150). The learner (105) uses a computer device to access game activities and provide input to the game. The game starts by selecting a character (110), and selecting a profession (112) for the character. The character then may engage in activities within the activity module (180) that can advance the character's experience points in the character level system (114). The first activities are jobs (132). When sufficient jobs have been mastered the character is permitted to engage in projects (134). Projects (134) produce persistent game play objects (PGOs) (128) or character enhancements (126) upon successful completion of the project, which are reflected in the character's performance or stored in the character inventory (122), and also contribute to the character's level in the character level system (114). Characters may also participate in special projects for PGO enhancement (138) once the prerequisite PGO has been obtained. These also advance the character's level. Advanced player-directed forms of PGO enhancement, called a craft (140), are also available once a sufficient character level has been attained. The PGOs are used in quests (146), competitions (148), and master quests (150) that are available once requisite PGO's are obtained. The performance in these also advances a character's level and provides rewards, which are PGO's in the form of ornamental trophy items, or monetary units, or other tools and implements that are useful for success on other features of the game. The participation in multi-player contests, such as quests (146), competitions (148), and master quests (150) is frequently in groups of characters through party membership (144) once a sufficient character level has been attained by all of a party's members. The character level system (114) determines a character's level through the character's success in the activities connected to it by the dotted lines. This provides the means for measuring game performance. The system provides the level information needed to allow each character to participate in the more advanced activities as shown by the decisions connected by a dashed line. An activity characters may also engage in is exchanging PGO's with other players using the character object exchange (124).

Characters may also join a community (142) that may have its own community inventory (130) of PGO's obtained from the community members. All activities are within the same realm (180) or consistent themed game-world, and thus the community can be a sociopolitical organization sized to fit the game theme. Examples are a village, a city, a country, a region, a planet, or a galaxy.

The jobs (132), projects (134), PGO enhancements (138), and crafts (140) the character participates in require learning and demonstrating each of the target education skills (120) chosen for the game. This provides means for engaging each learner in target education skill practice. In the jobs (132) the learner is provided corrective feedback when errors are made, this is direct feedback. In the projects (134), when generating PGO's and the PGO enhancements (138) and crafts (140) the performance of the PGO or enhancement produced supplies the feedback, this is indirect feedback. Errors made in demonstrating the target education skill results in poor performance of the PGO in quests and competitions. The learner's success in mastering these skills is demonstrated by the character profile (116) that is translated into the learner profile (118).

Learners (105) may be anyone able to operate a computer device and therefore can include pre-kindergarten ages. The target education skills (120) must therefore be chosen for specific desired learner's educational attainments. The learner accesses the game through a learner control module (105) that may be a networked computer, a computer connected to the Internet/Intranet, a wireless networked dedicated gaming device, or other computer device capable of displaying the game and accepting control inputs from the learner. The learner is engaged with the system by creating a representative identity called the character (110) in the terms of the game. The learner can customize the character appearance and the learner may also create multiple characters, if desired. Characters (110) are visible to the learner and other players in the game realm (160). The learner's character is persistent as it exists across multiple sessions of gameplay, and this persistence continues indefinitely for the term of the game which does not have a fixed endpoint and may continue for long periods of time, i.e., months or years. The character facilitates engaging the learner in the educational game playing system. The character (110) will reflect achievements in the gameplay through a feedback and signification scheme in the character level system (114), as well as through character attributes (125) and the amassing of increasing numbers of PGOs (128) and PGO enhancements (138).

The character level system (114) accumulates the experience and accomplishments of the learner's character (110) by allocating an experience point value awarded when the character successfully completes the objective of a game activity. The experience points actually awarded the character are the experience points assigned the game activity weighted by reducing factors of the character's existing level, any relevant character attributes (125), and an indicator of how often the activity was attempted prior to a successful completion. This structure compels the learner to advance their characters through continuous, increasingly challenging gameplay that requires considerable learner effort.

The character level system (114) provides feedback to the learner on the character's current experience point level through visual cues like bar graphs that appear in the learner's interface (105). The learner may also open the character profile (118), which provides a broad view of the character's game experiences that are used as data for the learner's profile (118), which is maintained outside the game realm.

Target educational skills (120) are the knowledge that learners desire to, or it is desired for them, to possess as a result of game play. The aggregation of these skills is broken down into discrete components for use in the game and these discrete components are used in game activities.

The realm (160) refers to the server to which a learner is subscribed. In this realm the learner's character(s) and the character's possessions are persistent. The server provides full or partial instances of the virtual world portrayed by the game, as needed for the play in progress. The realm accommodates multiple learners and multiple characters as required.

A character is created with a profession (112) selected. The choices available provide diverse game options in advancing a character through the game. The profession will bias the character towards a specific set of jobs (132) consistent with the virtual game world. This does not exempt the learner from the required target education skills (120) but it does vary the practice problems for the skill to fit the profession. The character's profession will also vary the amount of selected advanced game activities available, for example more enhancements to a gameplay object (PGO) may be available to one profession than another to be consistent with the virtual game world.

Figure 2:
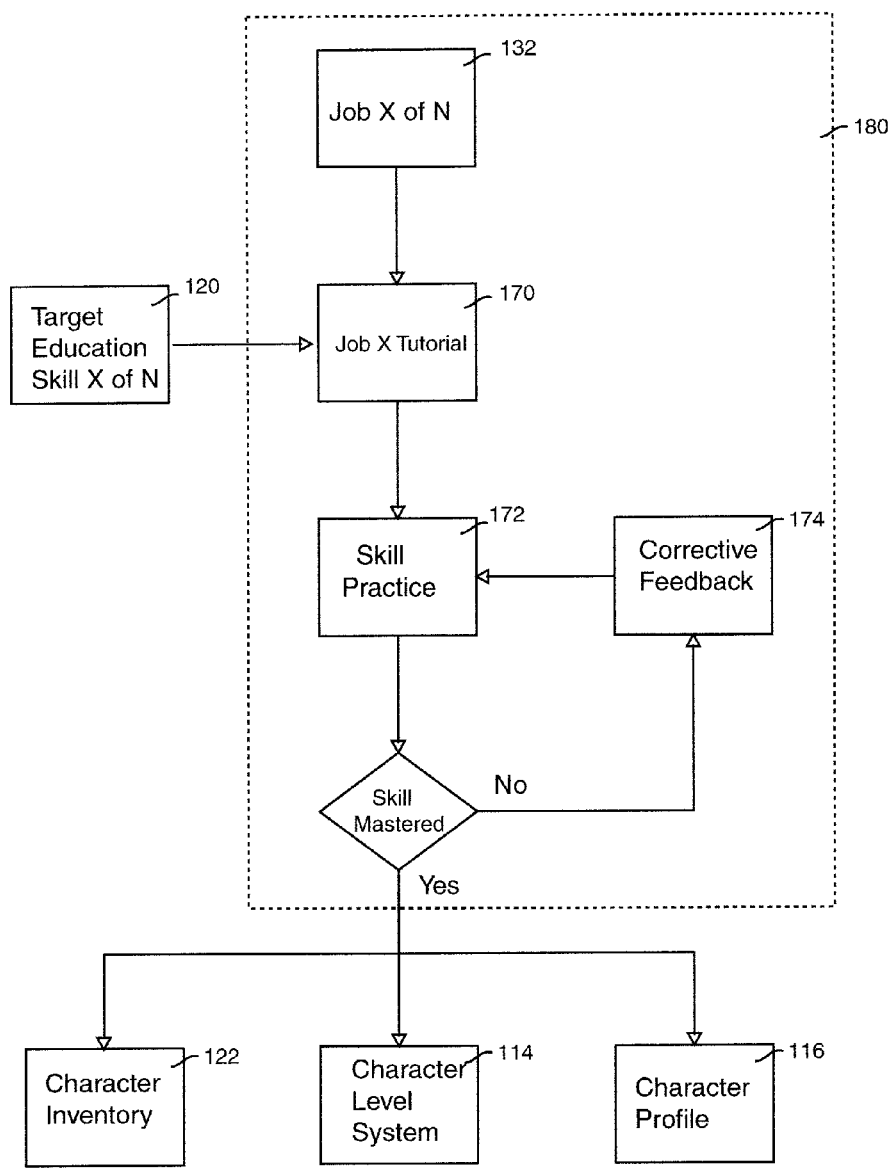
FIG. 2 is a block diagram of the structure of a job.

The learner's character starts play with a series of jobs (132). FIG. 2 shows the job process. Jobs (132) are presented individually in a sequence building on each other in the target education skills (120). Each job (132) includes a tutorial on one or more of the target education skills (120) associated with the job. The tutorial is followed by a skill practice (172). Since the job is within the realm (160) of the virtual game world, the learner's character is tasked in a job to help non-player game characters, or other learner game characters, accomplish a task. The task is the skill practice (172) related to the character's profession in the realm (example: a beastmaster may be tasked with using target math skills to plan the building of an animal holding pen). The job becomes immediately meaningful and relevant to the learner in order to advance the learner's character. The tutorial is given by a virtual world job master in the character's profession, who gives a comprehensive overview of the process, understanding, and steps needed to be performed to demonstrate mastery of the skill. Then the characters are given a chance to practice the skill supported by corrective feedback from the job master while accomplishing the job. The pace at which the job and its skills is presented is adjusted for the ability of each learner. Additional tutorials and focused instruction are given as corrective feedback (174), as needed, to assist learners struggling with a skill. The job activity is on an individual basis so the struggling learner does not impede the progress of a faster learner. Satisfactory mastery of the task provides the character with experience points in the character level system (114). The mastery of the specific job is also added to the character inventory (122) for possible future advanced use in the game activities, and to the persistent character profile (116). The actual experience points awarded depends on the number of attempts at the skill practice (172) made requiring corrective feedback (174).

The series of jobs is the game play until the character reaches a preset level of accomplishment indicating sufficient mastery of the basic target education skills (120) to allow the character to engage in more advanced game activity, called projects (134).

Figure 3:
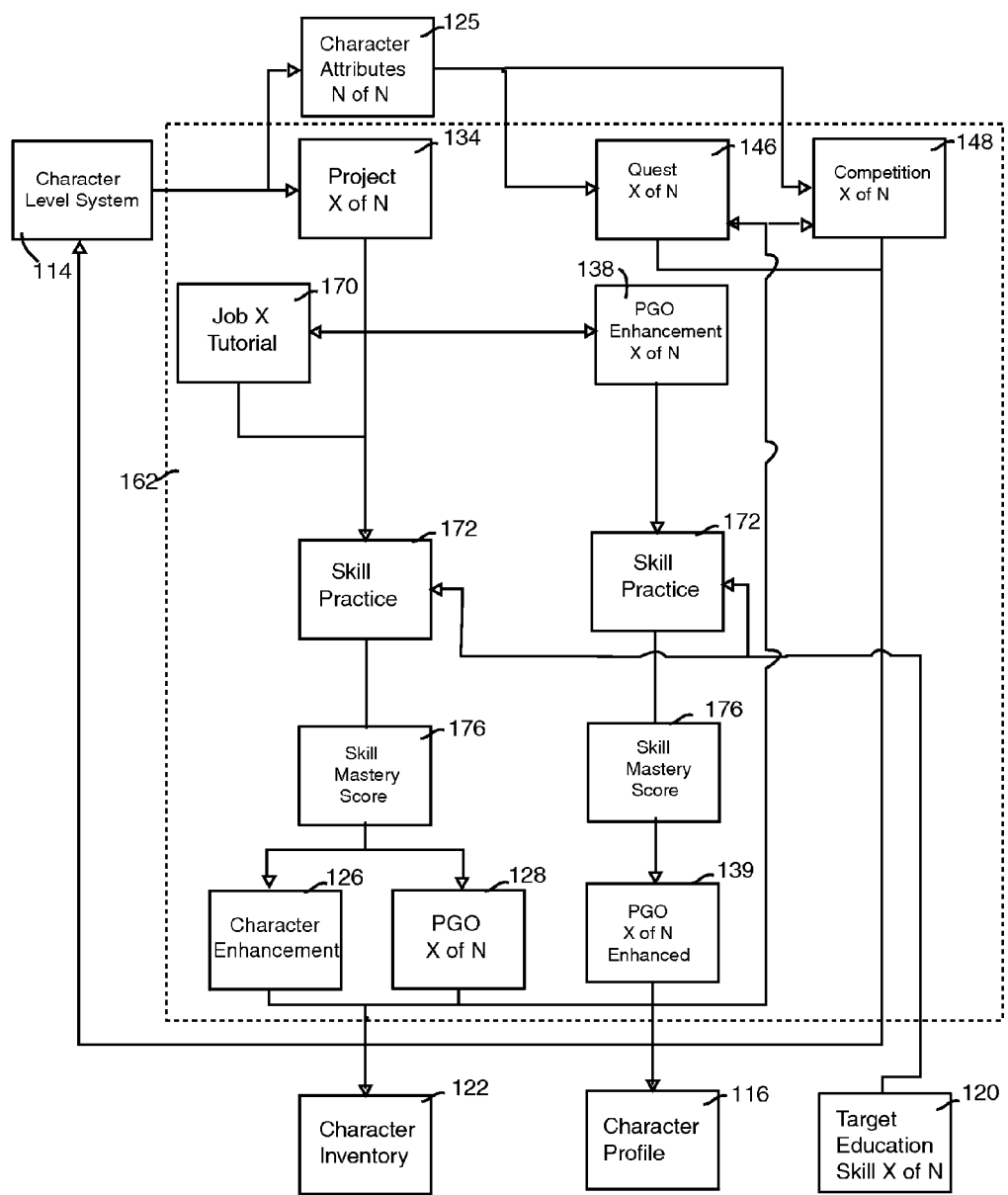
FIG. 3 is a block diagram of the structure of a project.

A project (134) is made available to a character when the character has attained the required level as shown in FIG. 1. FIG. 3 shows the project game activity. Here learners may use the skills acquired in their jobs to advance game play. Simpler projects (134) are available after completion of the basic series of jobs (132). More complex projects (134) may require a level attained after completion of other projects (134), additional jobs (132) and more advanced game activities such as PGO enhancements (138) or crafts (140), or participation in quests and competitions. The unlocking of projects is dependent on the target education skills and having demonstrated the pre-requisites of the skills. Additionally PGO enhancements require possession of the PGO to be enhanced. A project (134) is a multi-step sequence that characters engage in to create character-maintained persistent gameplay objects (PGO) (128) or persistent character enhancements (126). PGO (128) examples are buildings and other structures, vehicles, creatures, pets, tools, clothing, artwork, and technology items. Persistent character enhancements are improved capabilities in character attributes (125) consistent with the game's chosen setting and story, such as greater strength, improved aim, or superpowers such as the ability to fly. These objects or enhancements may be time limited, expiring in a period of time unless enhanced or maintained. In addition to creating the PGO, enhancing the character, or enhancing the PGO, project or PGO enhancement completion provides the character with experience points in the character level system (114). The PGO, character enhancement, or enhanced PGO (139) is also added to the character inventory (122), and to the persistent character profile (116).

Projects (134) and PGO enhancements (138) are in a domain (162), as shown in FIG., that contains thematically similar elements of the virtual game world. The domain may include domain specific jobs, project activities, quests, and competitions. A domain example includes a dragon academy that offers a dragon companion PGO (128) following completion of, among the other prerequisites, a job tutorial on fence mending prior to the project of raising the dragon companion. Next, associated quests and competitions may be called names like Faraway Mountain Fetch and Dragon Arena Races respectively.

Project (134) or PGO enhancement (138) or persistent character enhancement (126) feedback is related to the skill practice (172) in the form of performance of the PGO or character attribute (125) in quests (146), competitions (148) or master quests (150). Failure to optimally perform a skill practice (172) provides indirect feedback in the form of a low skill mastery score (176) that appears in the game as PGOs or character enhancements that are low in, or degrade in, performance. This provides means for each learner receiving one or more game possessions for demonstrating the target education skills. In a fantasy setting, a PGO-related example is a dragon companion for which a learner did not optimally size the holding pen. The dragon companion then will not have the optimum wingspan or energy level for a dragon due to the pen being too small or having expended its energy wandering in the large pen. The character will be able to do some quests or competitions but not all of them. Each quest or competition provides a range of character level increases and those playing with degraded performance PGOs will receive lower rewards. This provides means for a learner receiving feedback on errors in demonstration of target education skills by reduced game performance of game possessions. A character attribute (125) example in a similar setting would be battling a monster adversary with a persistent character enhancement such as a debilitating magic spell. If the learner did not respond at mastery level in the qualifying project, then the enhancement would not work on every attempt, and the character may be thwarted in its goal to defeat this adversary resulting in lowered reward prospects.

Figure 4:
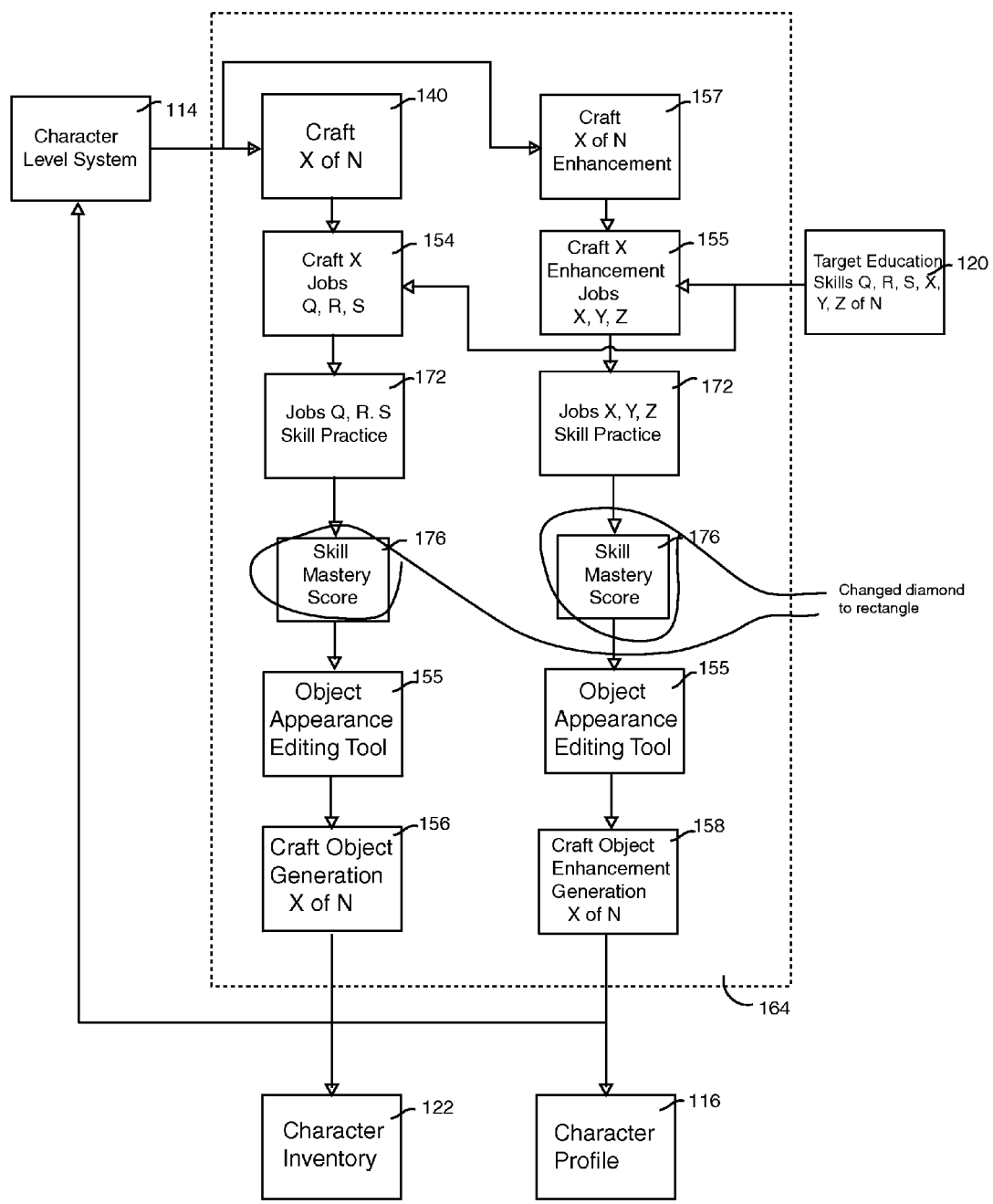
FIG. 4 is a block diagram of the structure of a craft.

Crafts, shown in FIG. 4, are special forms of PGOs called craft objects (156) that can be customized for use in quests and competitions or for exchange with other characters. There are multiple crafts available to characters when the character has attained the required level for the crafts. A craft object (156) is generated in a craft zone (164) that contains various context-specific jobs (154) that must be satisfactorily mastered prior to the character being empowered with craft generation capability. Craft zones (164) are related to project domains (162) by possessing similar thematic elements, for example one craft zone may provide dragon saddles, dragon helmets, and dragon wands related to the dragon companion produced in the dragon academy domain.

Feedback is given in the form of performance of the character in producing the craft object. The craft object (156) or craft object enhancement (158) is related to the skill practice (172) by the quality of the craft. Failure to optimally perform a skill practice (172) provides a low skill mastery score (176). The complexity of the craft object generation (156) is dependent on the score. This is accomplished with the use of an object appearance editing tool (155), whose capabilities are correlated to the skill mastery score (176) of the player. A character with a high skill mastery score may be able to produce intricate patters on a dragon saddle, but a character with a medium score may only be able to choose basic coloration, for example. In addition to creating the craft object, craft completion provides the character with experience points in the character level system (114). The PGO is also added to the character inventory (122), and to the persistent character profile (116).

Figure 5:
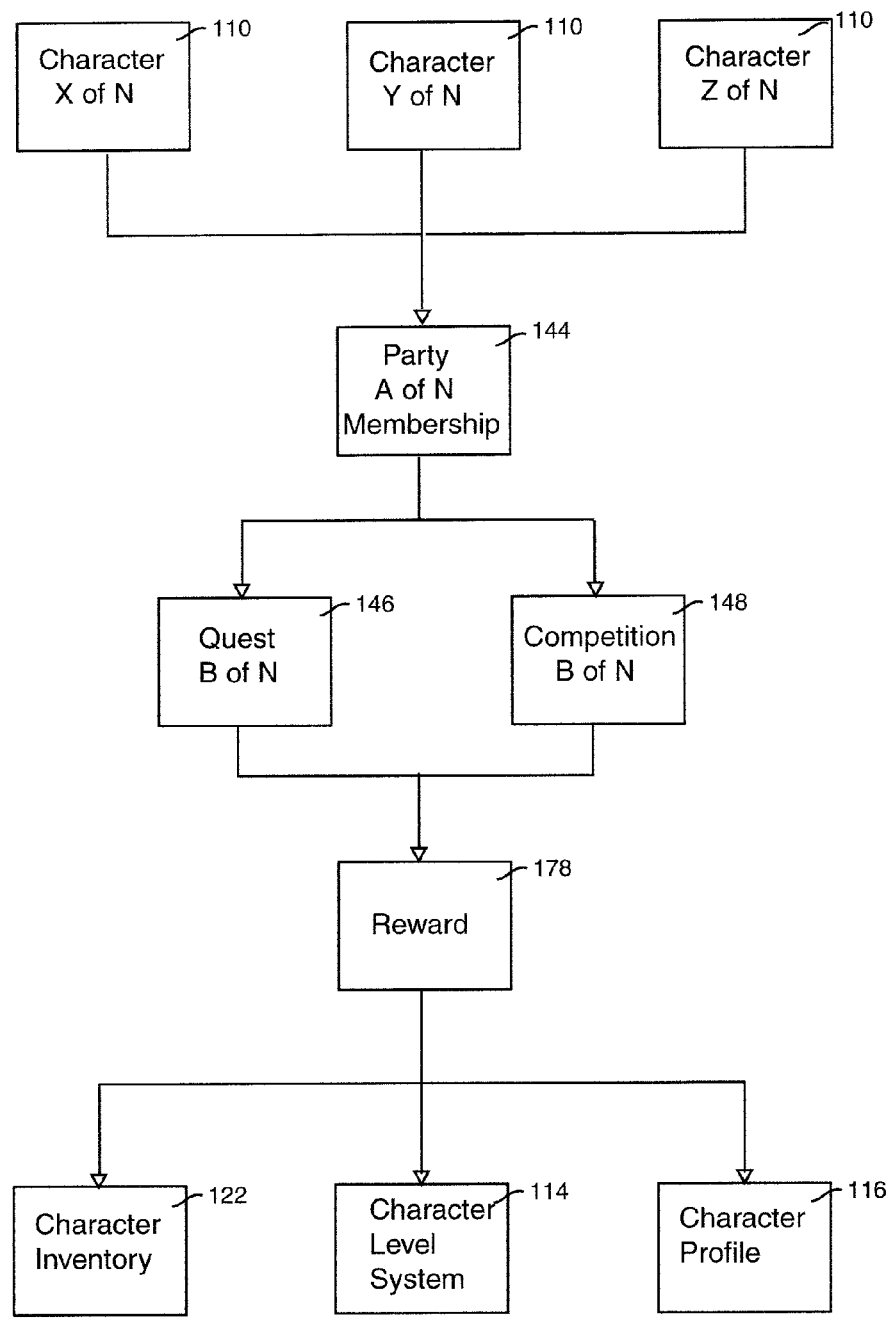
FIG. 5 is a block diagram of the structure of a Master Quest.

Parties (144) are transient groups of characters that are banded together for specific gameplay objectives as shown in FIG. 5. They are frequently used in quests (146) and competitions (148). Parties make it possible to have quests and competitions that require more than one character (110). An example is a quest task that may require several characters or characters' PGOs to perform. Parties can also be entrants in competitions where several parties may compete against each other. Participating in challenges that require small groups is a compelling system for the learner because it introduces the prospect of creating and maintaining group cohesion, which is time consuming and rewarding and therefore adds to the motivating structure of the overall massively multiplayer educational online game system.

Party formation is affected by the desire to include characters from multiple professions in order to maximize the chances for success of the party. Example: a party on a Far Mountain Fetch Quest within the Dragon Academy benefits from a Beastmaster, because this type of character is more likely to have increased handling skills for the Dragon Companion PGO and will therefore be able to execute important maneuvers like a quick dive to save another party member who may slide off of their dragon companion on a particularly tricky part of the flight path. A party with multiple professions increases the variety of characters and, in improving the chances of success, also increases the payoffs from cooperation. It also motivates a higher-level strategic orientation to the choices of the game, including those surrounding character creation and profession choice. This increased social and cooperative richness provides an additional dimension of player absorption in the game system, further increasing the motivational power of the overall system.

In addition to the enjoyment of quests and competitions, completion of these provides the characters involved with additional experience points in the character level system (114), and the quest or competition is added to the persistent character profile (116). The experience points awarded can be the same for each member of a party but will vary between parties depending on the performance in the quest or competition. In addition to character experience points, quests and competitions also offer rewards (178). These rewards can be ornamental trophy items, or monetary units, or other tools, materials, and implements that are useful for success on individual or community (142) activities. These rewards are stored in the character inventory (122) or may be used to advance a community (142) to which the character belongs by adding the reward to the community inventory (130).

Figure 6:
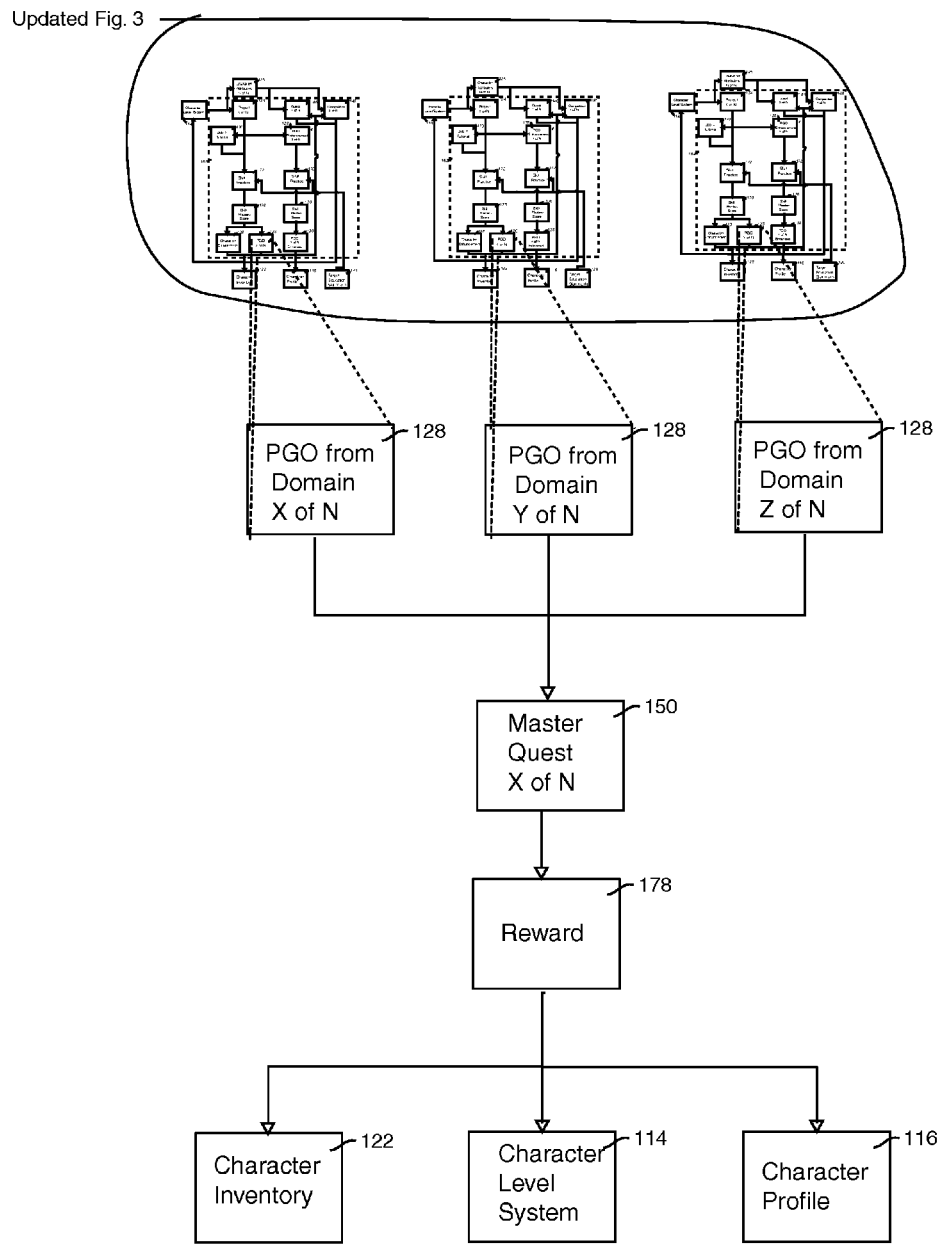
FIG. 6 is a block diagram of the grouping of characters in party membership for quest participation.

Master quests (150) are similar to quests but they utilize PGOs from a variety of separate project domains (128) as shown in FIG. 6. Characters may participate in some master quests individually using their character inventory of PGOs or may undertake the master quest (150) with other characters with similar or different PGOs. Differing professions of the characters in a master quest is useful where the characters participate with different PGOs related to the professions. For example: a Beastmaster may participate with his or her high level Dragon Companion PGO (128), such as X of N in FIG. 6, on a master quest in the company of a Techomancer who may possess a high level Sea Pod PGO (128), such as Y of N in FIG. 6. Completion of the master quest (150) provides the characters involved with additional experience points in the character level system (114) and rewards (178) that are stored in the character's inventory (122). The quest or competition is added to the persistent character profile (116).

Figure 7A:
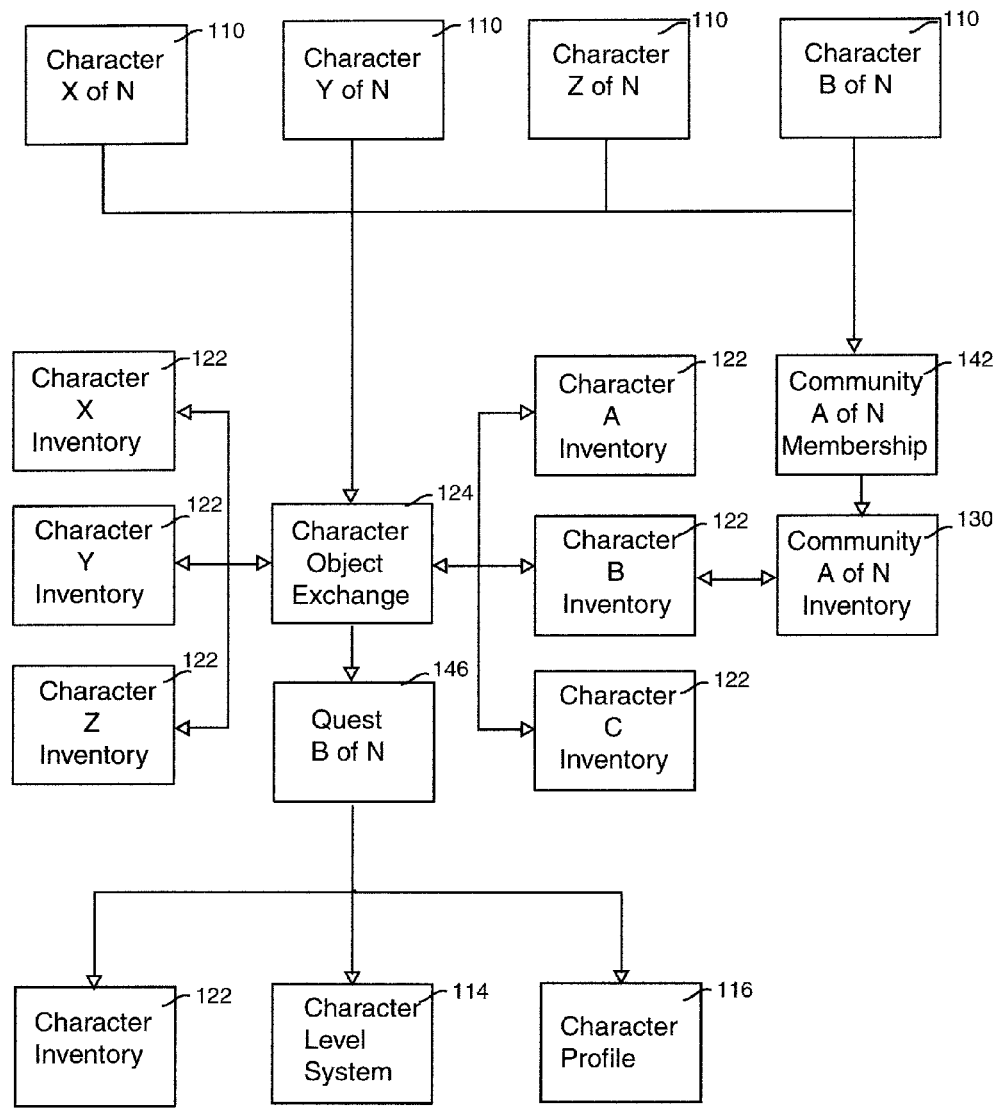
FIG. 7a is a block diagram of operation of the character object exchange. The use of grouping characters in community membership to maintain a community inventory is also shown.
Figure 7B:
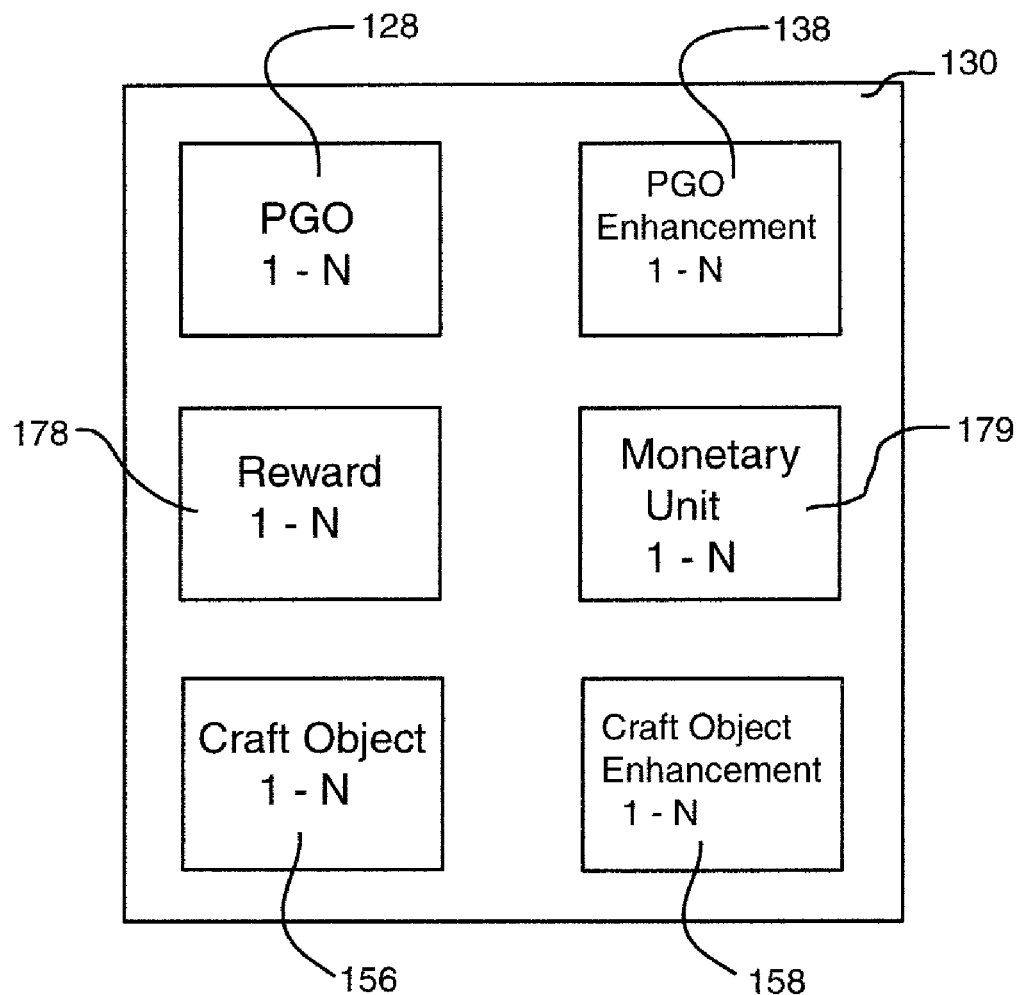
FIG. 7b is a diagram of the character inventory showing the inventories maintained.

The character inventory (122) maintains a record of all the PGOs (128), PGO enhancements (138), craft objects (156), and craft object enhancements (158) a character has obtained. These may be from projects (134), crafts (140) or from exchange of PGOs and craft objects with other characters in the character object exchange (124) shown in FIG. 7a. Characters differ in the capacity of the character inventory (122) depending on their game experience point level and whether they possess PGOs that increase character inventory capacity, like a backpack for storage of the PGOs. The character inventory (122) also contains rewards (178) that the character has won through the successful completion of quests and competitions of all sub-varieties. In addition the character inventory (122) contains the balance of monetary units (179) that the character possesses, as shown in FIG. 7b.

In the character object exchange (124) characters may barter PGOs, enhanced PGOs, craft objects (156), and reward items (178) with one another, or sell them for monetary units (179), providing a virtual economy. Characters who specialize in crafts may sell their craft objects (156) to obtain additional character level for their efforts, creating a virtual economy. Certain PGOs and quest reward items are needed to participate in additional quests (146) or competitions (148), others are specific inputs required for project (134) or PGO enhancement (138) completion, or are needed for a craft (140), or are necessary for improving a community (130). The result of exchanges in the character object exchange (124) is a change in the character inventory (122) reflecting the exchanges made, and the exchanges are recorded in the persistent character profile (116). This provides means for providing a virtual economy between characters using monetary units.

Gameplay is deepened by the character object exchange (124) because characters can unlock value from their previous time expenditure and focus areas. The benefits of an implicit division of labor are gained in the overall system and as such provide the learner with the incentive to explore and pursue particular tasks with high levels of concentrated effort. This expands the amount of time a particular learner will find enjoyable to spend in the system, and therefore increases the range of skills and deepens the mastery of specific sets of skills that the learner has already acquired, further increasing the motivational power of the system.

Community membership (142) is available to characters that have achieved the basic character level by completing the jobs for that level. Characters participating in a community obtain additional rewards that accrue to the community as it increases in value during the game. An example of a community in the game world may be the opportunity to join a village, city-state, or country in the realm of the game. Community payoffs can result from members competing successfully in competitions (148) against or with other communities. Communities may also assess taxes on members that offset the additional payoffs. The resultant community inventory (130), shown in FIG. 7a, may be traded by community members to obtain PGOs needed for other game activities, which in turn also provide additional rewards.

Figure 8:
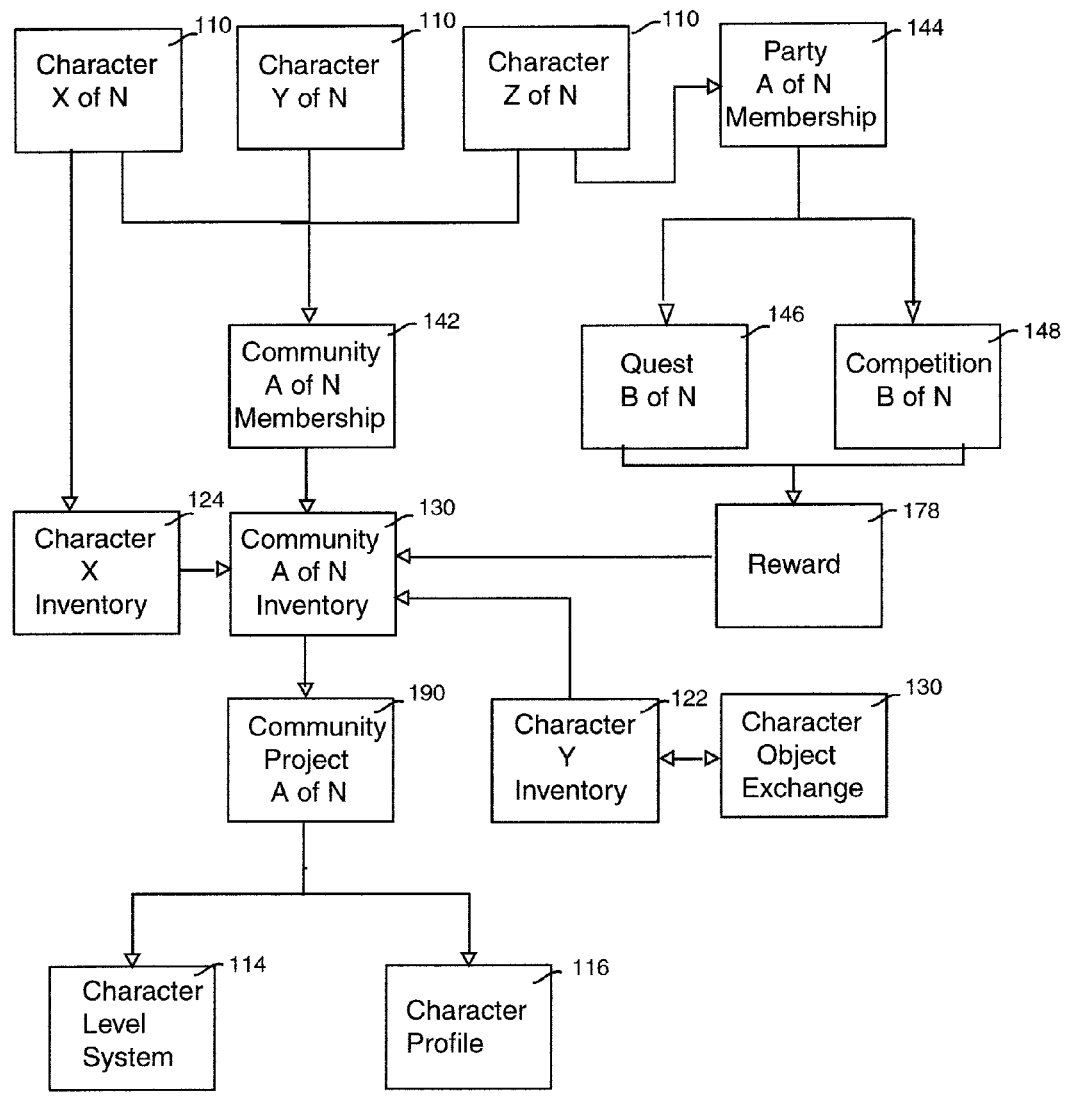
FIG. 8 is a block diagram of the use of a community to involve characters in community projects.

Characters have an incentive to contribute rewards to a community inventory to advance the community by involvement in projects that improve the community. This involvement leads to motivating a character with completion of the community project. Examples of community projects are constructing dwellings, factories, mines, schools. Characters (110) contribute through providing resources in the various ways shown in FIG. 8. This includes providing the resource directly from the character inventory (124), providing the reward (178) from a quest (146) or competition (148), and obtaining items desired for the community from the character object exchange (130). The completion of projects by a community enhances community members level in the character level system (114), which provides these characters the opportunity for additional game activities, such as quests and competitions. The community serves as another motivation for the learner because it provides participation in a group activity that rewards active participation and therefore adds to the motivating structure of the overall massively multiplayer educational online game system.

The totality of game experience is recorded in a learner's character profile (118). The character profiles of a learner are translated into a learner profile (118) outside the game realm. This learner profile (118) is expressed in terms of mastery and performance achieved by the learner's character(s) experiences in the game world. For the learner this data can also be represented visually using a bar graph, where basic to total mastery is presented along a continuum and the coefficient of this is represented by line width or coloration scales or both. This provides an effective way for the learner to gauge his or her progress in mastering the systematic knowledge area. This profile also enables other selected persons, such as parents or educators, to view how the achievements in the game system provide mastery of the target educational skills (120). The achievement can be represented in term of mastery of specific skills or standards, detailing the learner's time-on-task and mastery level. The profile may also be aligned to other assessments including classroom-based assessments, national and state assessments, and normative classifications.

Operation

Figure 9A:
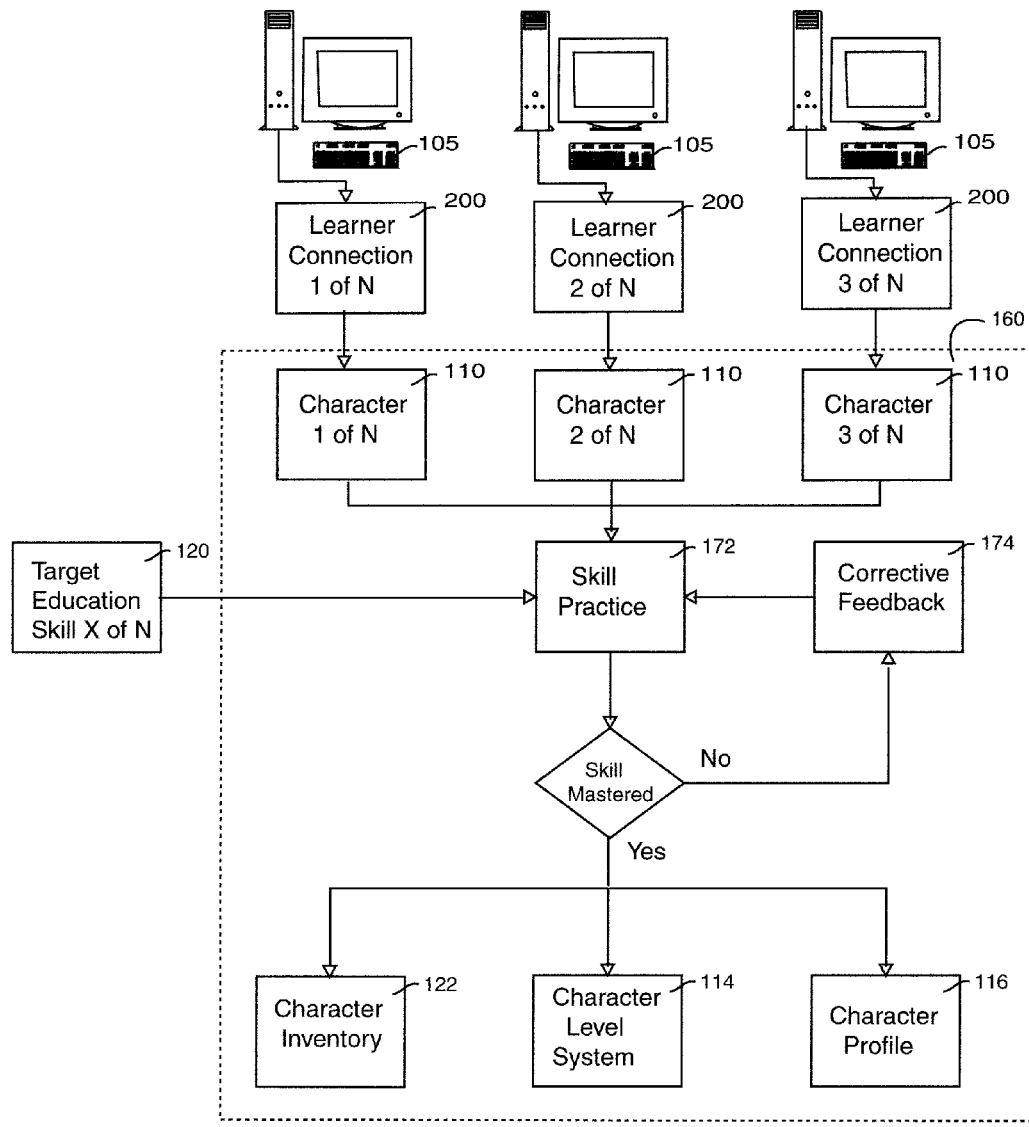
FIG. 9a is a block diagram showing the method of teaching target education skills to learners.

Teaching education skills to learners using the massively multiplayer educational online role playing game is shown in FIG. 9a. The learner uses a computer or other gaming device capable of receiving the learner's input to the game and displaying the game realm content. The learner is depicted as providing input through a keyboard in FIG. 9a. The device is connected with the game realm (160) through a learner connection (200). The learner connection (200) may be an Internet web portal, a wireless network with Internet capability, or a dedicated network, such as found in an educational institute. The learner uses their character (110) to engage the game. The game assigns the character an initial experience points level. Accumulating additional experience points requires demonstration of one or more target education skills (120) in a skill practice (122). Errors made in the skill practice are corrected by providing corrective feedback (174). This feedback may be immediate direct feedback, or indirect feedback delayed through game play results as explained previously. The demonstration of target education skills raises the character's experience point level an amount dependant on the errors made as reflected in the character level system (114) and the character profile (116) as also explained previously.

When the character has gained sufficient experience points more advanced game activities become available as explained previously. These advanced game activities provide the character with several forms of PGO for demonstrating target education skills (120) that are maintained in the character inventory (122).

Figure 9B:
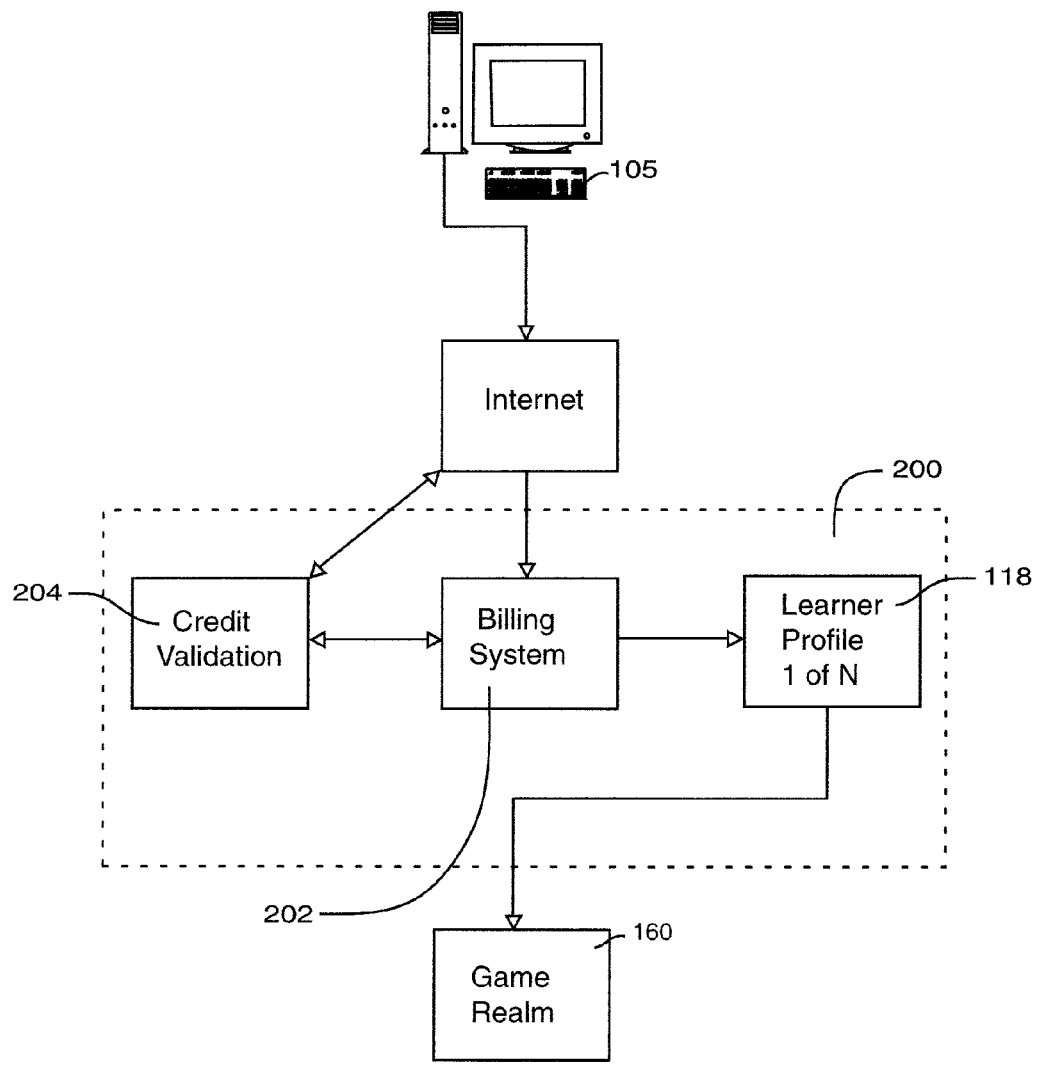
FIG. 9b is a block diagram showing a typical method of connecting a learner to the game.

A method of providing a learner (105) access to the game realm is shown on FIG. 9b. This learner (105) uses an Internet connected computer for access to the learner connection (200) that contains the billing system (202), which verifies the payment status of the learner's account, or verifies the learner's credit, if a new account. Depending on the mode of operation, the learner's account is charged on a periodic basis to maintain access to the game. The learner's profile (118) is then updated to log the access to the game realm (160) and updated periodically as gameplay continues, as discussed previously. The learner plays the game through a persistent character (110) uniquely maintained by the learner as shown in FIG. 1 and resultant gameplay is reflected in the character profile, and also in the learner's profile as target education skills are demonstrated through application and mastery in the game.

Alternative Embodiments

Figure 10:
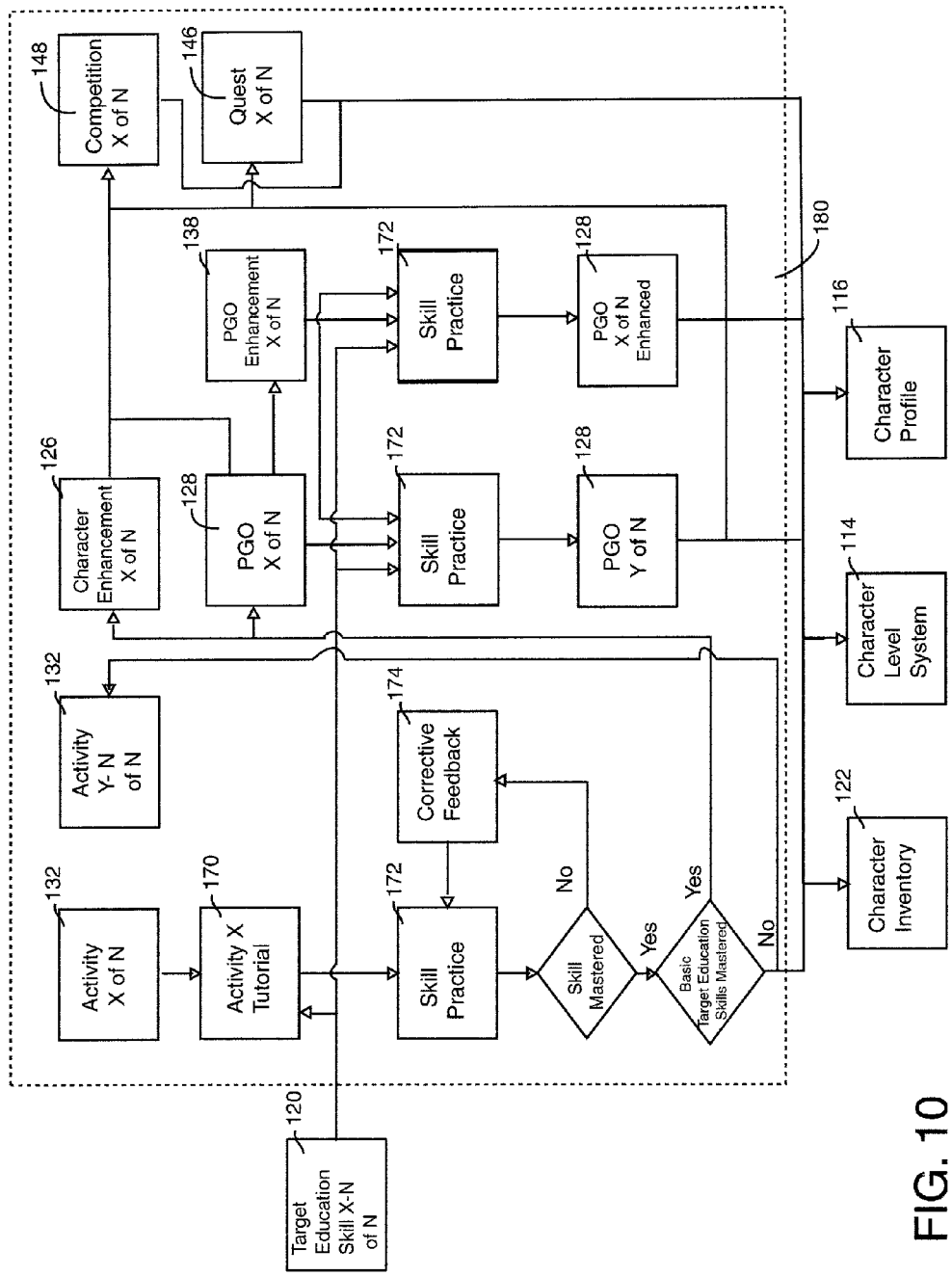
FIG. 10 is a block diagram of an embodiment showing an activity module in which the distinction between jobs, projects, crafts, quests, and competitions is blurred to support a smaller set of target education skills.

An alternative massively multiplayer educational online game for use with smaller sets of target educational skills is shown in FIG. 10. Here the distinction between jobs, projects, crafts, quests and competitions is blurred. All gameplay is within the activity module (180) in this embodiment. The activities (132) provide a tutorial (170) that covers the entire set of skills. Each skill is practiced (172) and corrective feedback provided as needed. When all basic target education skills are mastered, the character is awarded a PGO (128) and then may proceed to obtain additional PGOs through skill practice (172), obtain PGO enhancements (138) through different skill practices, or continue onto quests (146) and competitions (148). In these quests (146) and competitions (148), problems with PGO performance may be resolved by satisfactory completion of skill practices before continuing on in the quest or competition. The skill practices for additional PGOs or PGO enhancement demonstrate higher-level mastery of the target education skills than in the activity skill practice and provide both direct feedback in the skill practice and indirect feedback from the quest or competition as shown in FIG. 10. This embodiment is also appropriate for mobile gaming devices with more limited capacity, or for younger learners who can grow impatient with delays in character development.

Figure 11:
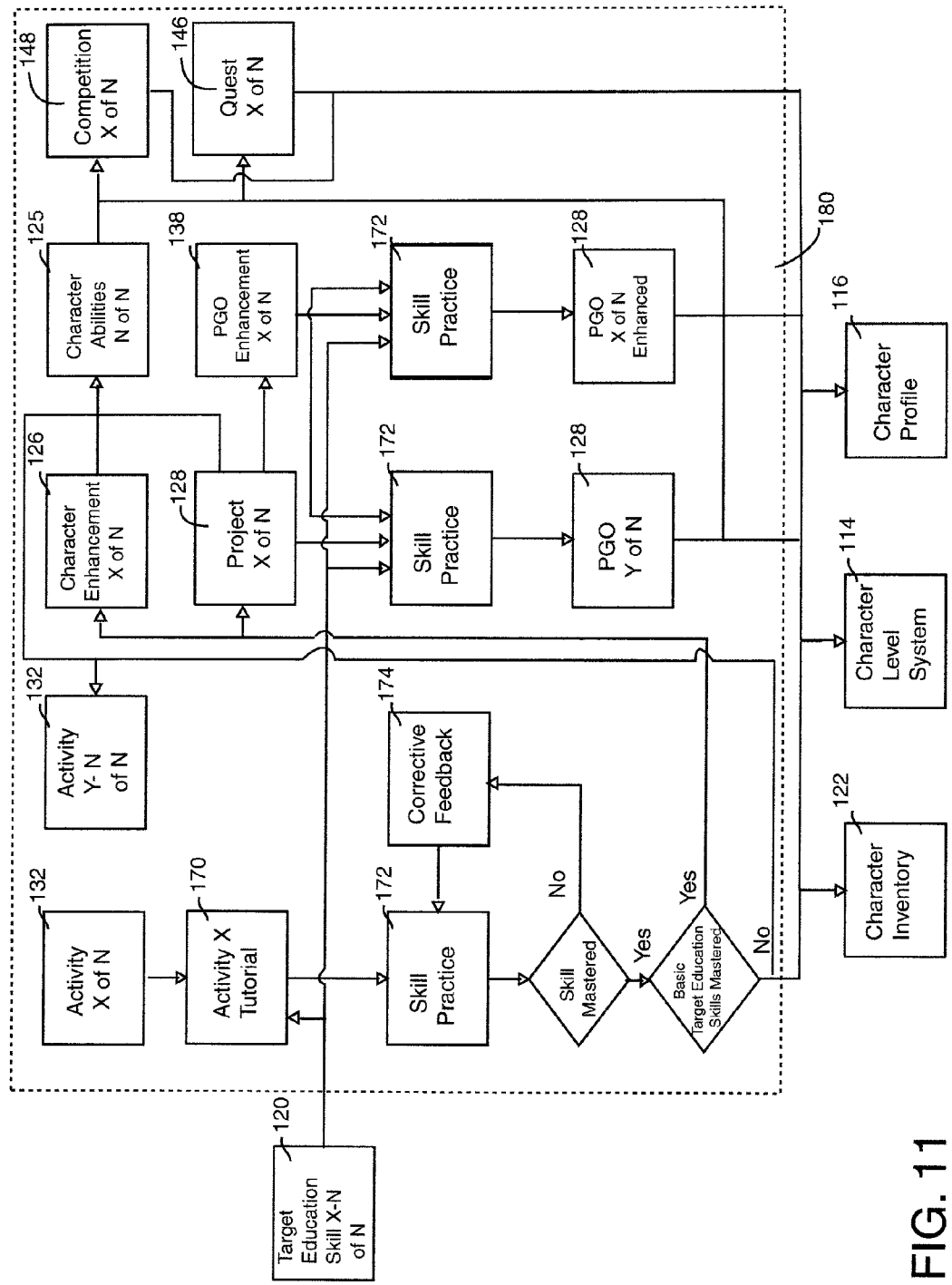
FIG. 11 is a block diagram of an embodiment showing an activity module in which the payoff on educational skills learning applies to the character's abilities through character enhancements which progressively increase the character's fitness for quests and competitions to support a smaller set of target education skills.

Another alternative massively multiplayer educational online game for use with smaller sets of target educational skills is shown in FIG. 11. Here the payoff on educational skills learning applies to the character's abilities (125) through character enhancements (126), which progressively increase the character's fitness for quests and competitions, but without the need to engage in projects in order to achieve these enhancements. In this embodiment, the activities (132) provide a tutorial (170) that covers the entire set of skills. Each skill is practiced (172) and corrective feedback provided as needed. When all basic target education skills are mastered, the character's abilities (125) are modified through character enhancements (126), which upgrade specific abilities that are assigned to the character, with the selection of these ability types dependent on the story and setting. Characters may then proceed to obtain additional character enhancements through additional skill practice (172) or continue onto quests (146) and competitions (148). The activity (132) then provides skill practices (172) with both direct feedback in the skill practice and indirect feedback from the character ability (125) in quests (146) or competitions (148) as shown in FIG. 11. Depending on the level of gameplay depth desired in the implementation of this embodiment, characters may also pursue projects, which generate PGOs (128) that are amenable to PGO enhancements (138) as indicated earlier. However, quests (146) or competitions (148) in this embodiment are capable of involving solely character abilities (125) as opposed to requiring PGOs (128). An example of such a quest would be a character or party (144) that must battle a monster or group of monsters in order to access rewards (178) and experience points which would then be reflected in the character inventory (122) and character level system (114) respectively. In these quests (146) and competitions (148), problems with character performance may be resolved by additional, satisfactory completion of skill practices (172), which would result in additional character enhancements (126) useful for success in the quest or competition.

Those familiar with the art recognize there are many possible applications and variations for the massively multiplayer educational online role playing game other than the embodiments recited. This recitation of the preferred and other embodiments is not intended to define or constrain the invention; rather the claims define the invention.

What is claimed is:

1. A method of providing a massive multiplayer educational role playing game to a learner from a server comprising:
   a. connecting a learner's control module to a learner connection arranged to connect to the server and containing a learner profile and a billing system;
   b. validating the learner's credit;
   c. updating the learner's profile for game access;
   d. selecting a multiplicity of target education skills;
   e. providing the learner one or more persistent characters used in the game with a starting character game level;
   f. using an activity module to provide a multiplicity of activities;
   g. requiring demonstration of target education skills in a first group of activities to provide the character a PGO;
   h. arranging first group activities to provide monetary units;
   i. enabling a character object exchange arranged such that characters exchange PGO's, whereby required objects are obtained by exchange;
   j. varying the type of PGO and amount of monetary units provided in first group activities dependent on errors in demonstration of target education skills;
   k. providing a second group of activities without target education skills;
   l. arranging the activity module to require a predetermined type and amount of PGO's produced by first group activities to successfully complete a second group activity whereby indirect feedback is provided;
   m. exchanging PGO's for monetary units;
   n. updating the learner's profile upon successful completion of activities for demonstration of target education skills; and
   o. charging the learner's credit card on a periodic basis, whereby for a payment of money, a learner is motivated by indirect feedback to learn target education skills.

2. The method of providing the game as in claim 1 further comprising providing PGO enhancements with variable performance characteristics in first group activities where the activity module also requires a predetermined performance characteristic PGO enhancement produced by first group activities to successfully complete a second group activity.

3. The method of providing the game as in claim 2 further comprising arranging the character object exchange such that characters exchange PGO's, PGO enhancements, and PGO enhancements with variable performance characteristics for monetary units whereby the required object is obtained by exchange.

4. The method of providing the game as in claim 3 further comprising providing character enhancements with variable performance characteristics in first group activities where the activity module also requires a predetermined performance characteristic character enhancement produced by first group activities to successfully complete a second group activity.

5. The method of providing the game as in claim 4 further comprising arranging the character object exchange such that characters exchange PGO's, PGO enhancements, character enhancements, PGO enhancements with variable performance characteristics, and character enhancements with variable performance characteristics for monetary units whereby the required object is obtained by exchange.

6. A system for motivating learner success in target education skill practice when playing a massive multiplayer educational role playing game from a server communicated through a learner connection to a learner's control module comprising:
  a. a multiplicity of characters such that each learner controls one or more persistent characters,
  b. the characters arranged such that they exist under the learner control during multiple sessions of game play;
  c. an activity module arranged to provide a multiplicity of activities;
  d. a multiplicity of target education skills chosen based on the learners educational attainment;
  e. the activities arranged in a first group including a target education skill practice and a second group without the target education skill;
  f. a character level system arranged to accumulate the experience and accomplishments of the character by allocating an experience point value when the character successfully completes a game activity;
  g. a character profile that is translated to a learner profile representing progress in mastery of the target educational skills;
  h. the character profile containing a profile of character game experiences including experience points;
  i. the activities in the first group arranged to give the character a possession chosen from the group consisting of craft object and craft object enhancement with a variable appearance;
  j. an activity arranged to provide monetary units;
  k. a character object exchange arranged such that a character obtains a possession appearance improvement using monetary units; and
  l. the activities in the second group arranged to show one or more possessions with a variable appearance wherein the learner is motivated by indirect feedback to succeed in target education skill practice by the desire to display attractive character possessions.

7. The system as in claim 6 further comprising:
  a. a character inventory that is arranged to record character possessions;
  b. selected activities in the first group arranged to provide a character inventory with a possession chosen from the group consisting of PGO, PGO attribute, and character attribute;
  c. the character object exchange arranged such that a character obtains a possession chosen from the group consisting of PGO, PGO attribute, and character attribute using monetary units; and
  d. one or more possessions required in the character inventory for successful completion of selected second group activities wherein the learner is motivated to succeed in target education skill practice in order to advance the character in the game and to produce a favorable learner profile.

8. The system as in claim 7 further comprising:
  a. selected activities in the first group arranged to provide a character inventory with one or more possessions with a variable performance attribute, the attribute improving with fewer errors in the skill practice;
  b. the character object exchange arranged such that a character obtains a possession with an improved performance attribute using monetary units; and
  c. activities in the second group arranged to require one or more possessions with a selected minimum performance attribute to succeed in the activity wherein the learner is provided motivation to succeed in target education skill practice to advance the character in the game and produce a favorable learner profile.

9. The system as in claim 8 further comprising:
  a. one or more communities with a multiple character community inventory such that first and second group activities are played in each community;
  b. a multiplicity of professions arranged such that the learner chooses a profession for each character;
  c. selected community activities arranged such that one or more characters participates in activities in a manner associated with the character's profession;
  d. selected group one activities arranged to provide a character with a profession-associated possession chosen from the group consisting of PGO, PGO attribute, and character attribute;
  e. the character object exchange arranged such that a character obtains a profession associated possession using monetary units; and
  f. one or more party, group, and community multi-character activities arranged to require one or more profession-associated possessions for successful completion of the activity, wherein the learner is provided motivation to succeed in target education skill practice to advance the character in the game and produce a favorable learner profile.

10. A method of using a multiplayer game from a server communicated through a learner connection to a learner's control module to provide indirect feedback to learners on educational skill practice results comprising:
  a. creating a game realm which provides a virtual world display on a learner control module;
  b. providing a multiplicity of characters within the realm arranged such that each learner controls one or more characters;
  c. keeping a character inventory of character possessions and attributes;
  d. tracking a multiplicity of character attributes;
  e. using an activity module to provide a multiplicity of activities;
  f. defining a multiplicity of target education skills chosen based on the learners educational attainment;

g. arranging the realm activities in a first group including a target education skill practice and a second group without the target education skill;
h. determining errors in target education skill practice;
i. measuring game performance in second group activities;
j. using one or more first type activities to vary the possessions attributes and character attributes provided for one or more second type activities dependant on errors in target education skill practice;
k. providing first type activities that provide rewards, such as monetary units;
l. arranging the character object exchange such that a character obtains a possession with a selected minimum performance attribute using monetary units; and
m. arranging second type game activities to require one or more specified possessions attributes and character attributes to improve game performance wherein the learner game performance provides indirect feedback on errors in target education skill practice, motivating the learner.

11. A multiplayer game for teaching learners a multiplicity of target education skills from a server communicated through a learner connection to a learner's control module comprising:
   a. means for engaging each learner in target education skill practice;
   b. means for each learner receiving one or more game possessions for demonstrating the target education skills;
   c. means for measuring game performance;
   d. means for game activities without target education skills;
   e. means for providing a virtual economy between characters using monetary units; and
   f. means for each learner receiving feedback on errors in demonstration of target education skills by reduced game performance of game possessions.

12. A method of providing indirect feedback on education skill practice errors to a learner playing an educational game from a server communicated through a learner connection to a learner's control module:
   a. providing the learner one or more characters used in the game with a starting character game level;
   b. selecting a set of target education skills;
   c. requiring a first type of game activity including target education skill practice to obtain a character possession;
   d. providing one or more character possessions with limited performance attributes if errors are made in the target education skill practice;
   e. allowing participation in a second type game activities without target education skills using possessions with limited performance attributes;
   f. determining a game performance level on second type game activities;
   g. requiring further participation in one or more first type game activity to obtain possessions that improve game performance level;
   h. providing a character inventory to maintain character possessions;
   i. requiring specific character possessions in inventory to improve game performance level in second type activities;
   j. withholding character possessions required to improve game performance level when errors are made in first type activity target education skill practice and providing possessions and character attributes with improved performance when less errors are made in the practice;
   k. providing a character object exchange arranged such that characters exchange possessions;
   l. using monetary units in the character object exchange wherein a virtual economy exists between characters; and
   m. providing first type game activities that reward a character with monetary units whereby the learner receives indirect feedback on errors in target education skill practice from game performance motivating the learner to reduce errors.

13. An educational multiplayer game from a server communicated through a learner connection to a learner's control module comprising:
   a. a multiplicity of characters arranged to be controlled by the players;
   b. a multiplicity of character possessions;
   c. a multiplicity of activities arranged for character participation using character possessions;
   d. a means for scoring activity success;
   e. selected activities arranged to require a possession for activity success;
   f. selected activities arranged for a character to obtain monetary units;
   g. a character object exchange arranged such that a character exchanges monetary units for possessions such that a virtual economy exists;
   h. one or more target education skills;
   i. the activities arranged in a first group including a target education skill practice and a second group without the target education skill;
   j. the first group activities arranged such that a skill mastery score is dependant on the errors in the target education skill;
   k. the first group activities further arranged to provide a variable performance attribute possession required for success in second group activities; and
   l. the second group activity score is dependant on the errors in the target education skill practice in the first group activity.

14. The game of claim 13 further comprising one or more second group activities arranged to require a specific possession for success in the activity and one or more first group activities arranged to provide the specific possession only if the target education skill practice meets a specified number of errors.

15. The game of claim 13 further comprising one or more first group activities arranged to provide a possession with a variable appearance, the appearance arranged to improve with fewer errors in target education skill practice.

16. The game of claim 13 further comprising one or more first group activities arranged to provide a character attribute with a variable performance in second group activities arranged such that performance improves with fewer errors in target education skill practice.

17. The game of claim 13 further comprising one or more first group activities arranged to provide the possession with a variable performance in second group activities arranged such that performance improves with fewer errors in target education skill practice.

18. The game of claim 13 further comprising providing additional activities based on fewer errors in target education skill practice.

19. The game of claim 13 further comprising providing one or more first group activities with a reward independent of errors in target education skill practice.

20. The game of claim 13 further comprising providing one or more second group activities with a reward independent of errors in target education skill practice.

21. The game of claim 19 further comprising varying the scoring of first group activities between the score dependant on errors in target education skill practice and the score independent of errors in target education skill practice.

22. The game of claim 20 further comprising varying the scoring of second group activities between the score dependant on errors in target education skill practice and the score independent of errors in target education skill practice.

* * * * *